United States Patent
Huang et al.

(10) Patent No.: US 12,138,828 B2
(45) Date of Patent: Nov. 12, 2024

(54) HOLLOW PELLETS AND METHODS OF SOAKING

(71) Applicants: Dow Global Technologies LLC, Midland, MI (US); Dow Silicones Corporation, Midland, MI (US)

(72) Inventors: Wenyi Huang, Midland, MI (US); Nicholas J. Horstman, Midland, MI (US); Jeffrey D. Wenzel, Midland, MI (US); Qian Gou, Collegeville, PA (US); Yabin Sun, Shanghai (CN); Mohamed Esseghir, Collegeville, PA (US); Yunfeng Yang, Shanghai (CN); Yonghua Gong, Shanghai (CN); Weiming Ma, Shanghai (CN); Jeffrey M. Cogen, Collegeville, PA (US); Hong Yang, Shanghai (CN)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 319 days.

(21) Appl. No.: 17/599,687

(22) PCT Filed: Mar. 29, 2019

(86) PCT No.: PCT/CN2019/080379
§ 371 (c)(1),
(2) Date: Sep. 29, 2021

(87) PCT Pub. No.: WO2020/198920
PCT Pub. Date: Oct. 8, 2020

(65) Prior Publication Data
US 2022/0161459 A1  May 26, 2022

(51) Int. Cl.
*B29B 9/12* (2006.01)
*B29B 9/16* (2006.01)
*C08J 3/20* (2006.01)

(52) U.S. Cl.
CPC ............... *B29B 9/12* (2013.01); *B29B 9/16* (2013.01); *C08J 3/203* (2013.01);
(Continued)

(58) Field of Classification Search
None
See application file for complete search history.

(56) References Cited

U.S. PATENT DOCUMENTS 5,677,383 A   10/1997 Chum et al.
6,111,023 A   8/2000 Chum et al.
(Continued)

FOREIGN PATENT DOCUMENTS

CN   102000567 A   4/2011
CN   103732643 A   4/2014
(Continued)

OTHER PUBLICATIONS

M. Talha Gokmen, Progress in Polymer Science 37 (2012) 365-405.

*Primary Examiner* — Ronak C Patel
(74) *Attorney, Agent, or Firm* — Boyle Fredrickson, S.C.

(57) ABSTRACT

The present disclosure provides a pellet. In an embodiment, the pellet includes a body having a first end and an opposing second end. The body is composed of a polymeric material. The body has a length and a diameter (body diameter). A channel having a diameter (channel diameter), extends through the body from the first end to the second end. The pellet has a channel diameter-to-body diameter ratio from 0.05 to 0.45. The present disclosure also provides a process for soaking the pellet in a liquid additive and forming a loaded pellet with the additive in the pellet body.

13 Claims, 4 Drawing Sheets

(52) U.S. Cl.
CPC ... *B29B 2009/161* (2013.01); *B29B 2009/163* (2013.01); *C08J 2323/08* (2013.01)

(56) References Cited

U.S. PATENT DOCUMENTS

| | | | |
|---|---|---|---|
| 7,259,129 | B2 | 8/2007 | Matusz et al. |
| 8,241,495 | B2 | 8/2012 | Aerts et al. |
| 8,641,946 | B2 | 2/2014 | Mackley et al. |
| 9,493,337 | B2 | 11/2016 | Zalamea et al. |
| 9,550,874 | B2 | 1/2017 | Saito et al. |
| 2004/0131853 | A1* | 7/2004 | Mushiake ............... B29B 9/12 428/402.22 |
| 2004/0260103 | A1 | 12/2004 | Matusz et al. |
| 2006/0178487 | A1* | 8/2006 | Weller .................... C08K 9/12 525/387 |
| 2009/0011182 | A1 | 1/2009 | Mackley et al. |
| 2011/0020574 | A1 | 1/2011 | Mackley et al. |
| 2011/0049038 | A1 | 3/2011 | Aerts et al. |
| 2013/0053248 | A1 | 2/2013 | Atkinson et al. |
| 2013/0288016 | A1 | 10/2013 | Koopmans et al. |
| 2014/0072776 | A1 | 3/2014 | Zalamea et al. |
| 2014/0113112 | A1 | 4/2014 | Koopmans et al. |
| 2014/0179864 | A1 | 6/2014 | Saito et al. |
| 2015/0001758 | A1 | 1/2015 | Martin et al. |
| 2015/0321409 | A1 | 11/2015 | Dooley et al. |
| 2017/0087759 | A1 | 3/2017 | Huang et al. |
| 2018/0222087 | A1* | 8/2018 | Tijhuis .................... B29B 9/06 |

FOREIGN PATENT DOCUMENTS

| | | |
|---|---|---|
| CN | 106431459 A | 2/2017 |
| CN | 107636052 A | 1/2018 |
| EP | 0320120 A1 | 6/1989 |
| JP | H04-327909 A | 11/1992 |
| WO | 2002/022732 A1 | 3/2002 |

\* cited by examiner

HOLLOW PELLETS AND METHODS OF SOAKING

BACKGROUND

It is known to soak pellets of polymer resin in liquid additives in order to infuse, or otherwise to combine, the additive to the polymeric pellets prior to further processing. In the production plastic coatings for power cables for example, olefin-based polymer pellets are oftentimes soaked in liquid peroxide prior to melt-blending or melt extrusion with other ingredients.

Unfortunately, additive soaking of olefin-based polymer pellets suffers from several drawbacks. Many olefin-based polymer pellets require long soaking times—10 or more hours—in order to incorporate sufficient amount of additive into the pellet. Such long soaking times impart added capital costs for soaking equipment and decrease production throughput rates.

The use of porous pellets is known as a way to reduce the soak time for olefin-based polymer pellets. However, porous olefin-based polymer pellets are expensive to produce, limiting their practical use in industry. Porous olefin-based polymer pellets also exhibit inhomogeneity issues when melt blended or extruded. Consequently, the art recognizes the need for polymeric resin pellets that can decrease additive soak time without deleteriously impacting downstream production steps.

The art further recognizes the need for pellets with increased surface area.

SUMMARY

The present disclosure provides a pellet. In an embodiment, the pellet includes a body having a first end and an opposing second end. The body is composed of a polymeric material. The body has a length and a diameter (body diameter). A channel having a diameter (channel diameter), extends through the body from the first end to the second end. The pellet has a channel diameter-to-body diameter ratio from 0.05 to 0.45.

The present disclosure provides a process. In an embodiment, the process includes providing a pellet having a body, the body having a first end and an opposing second end, the body composed of a polymeric material, the pellet having a channel extending through the body from the first end to the second end. The process includes soaking the pellet in an additive. The additive is in a liquid state. The additive having a material selected from the group consisting of a silane, an organic peroxide, an isocyanurate and combinations thereof. The process inclues forming a loaded pellet having the material in the body.

DEFINITIONS

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, (whether polymerized or otherwise), unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percentages are based on weight and all test methods are current as of the filing date of this disclosure.

"Blend," "polymer blend" and like terms refer to a combination of two or more polymers. Such a blend may or may not be miscible. Such a combination may or may not be phase separated. Such a combination may or may not contain one or more domain configurations, as determined from transmission electron spectroscopy, light scattering, x-ray scattering, and any other method known in the art.

"Ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene, Nonlimiting examples of linear polyethylene include linear low density polyethylene (LLDPE), ultra-low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metaliocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastoiners/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos and ExxonMobil.

An "interpolymer" (or "copolymer"), is a polymer prepared by the polymerization of at least two different monomers. This generic term includes copolymers, usually employed to refer to polymers prepared from two different monomers, and polymers prepared from more than two different monomers, e.g., terpolymers, tetrapolyrners, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD, LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

An "olefin-based polymer" or "polyolefin" is a polymer that contains more than 50 weight percent polymerized olefin monomer (based on total amount of polyrnerizable monomers), and optionally, may contain at least one comonomer. Nonlimiting examples of an olefin-based polymer include ethylene-based polymer and propylene-based polymer. An "olefin" and like terms refers to hydrocarbons consisting of hydrogen and carbon whose molecules contain a pair of carbon atoms linked together by a double bond.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ 60 -olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc, Nonlimiting examples of ULDPE and VLDPE include ATTANE™ ULDPE resins and FLEXOMER™ VLDPE resins, each available from The Dow Chemical Company.

"Melt blending" is a process in which at least two components are combined or otherwise mixed together, and at least one of the components is in a melted state. The melt blending may be accomplished by one or more of various know processes, e.g., batch mixing, extrusion blending, extrusion molding, and the like. "Melt blended" compositions are compositions which were formed through the process of melt blending.

"Thermoplastic polymer" and like terms refers to a linear or branched polymer that can be repeatedly softened and made Plowable when heated and returned to a hard state when cooled to room temperature. A thermoplastic polymer typically has an elastic modulus greater than 68.95 MPa (10,000 psi) as measured in accordance with ASTM D638-72. In addition, a thermoplastic polymer can be molded or extruded into an article of any predetermined shape when heated to the softened state.

DETAILED DESCRIPTION

The present disclosure provides a pellet. In an embodiment, the pellet includes a body that is composed of a polymeric material. The body has a first end and a second end located on an opposite side of the body. The body includes a length and a diameter. The body has a channel having a channel diameter. The channel extends through the body from the first end to the second end. The pellet has a channel diameter-to-body diameter ratio from 0.05 to 0.45.

Pellet

Figure 1A:
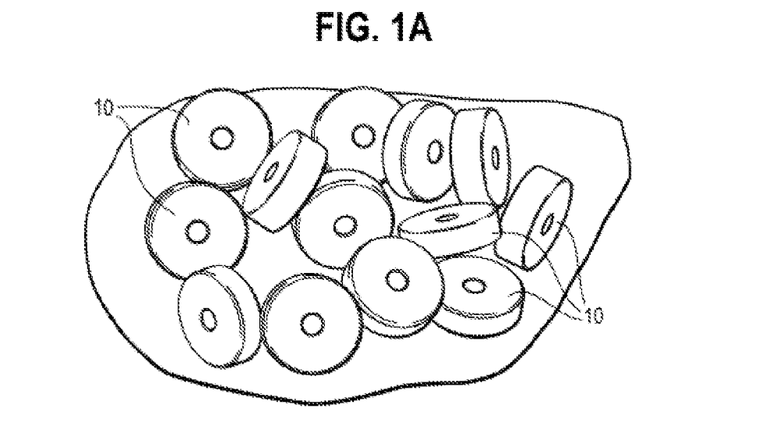
FIG. 1A is a perspective view of pellets having a channel extending through the pellet body, in accordance with an embodiment of the present disclosure.
Figure 1B:
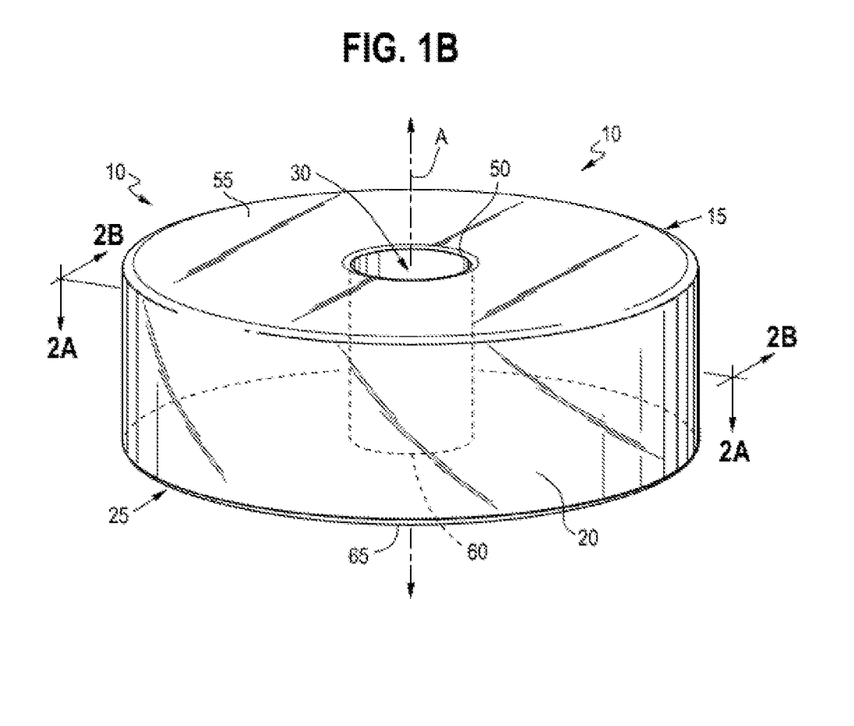
FIG. 1B is a perspective view of a hollow pellet, in accordance with an embodiment of the present disclosure.

Referring to the drawings and initially to FIG. 1A, a plurality of pellets of the present disclosure is shown. FIG. 1B shows an individual pellet 10, pellet 10 includes a body 20. The body 20 includes a first end 15 and a second end 25. Pellet 10 includes a channel 30. Channel 30 extends through the body 20 from the first end 15 to the second end 25. Pellet 10 with body 20 and channel 30 extending therethrough is hereafter interchangeably referred to as a "hollow pellet."

In an embodiment, the body 20 has a cylindrical shape. The body 20 includes the first end 15 and the second end 25, the ends having a circular shape or a generally circular shape. The first end 15 and the second end 25 are located on opposite sides of the body 20. An axis of symmetry A is located at the center of circles formed by the ends 15 and 25. Pellet 10 includes a channel 30 that is parallel to the axis of symmetry A. The channel 30 has a cylindrical shape, or a generally cylindrical shape, and is located in the center of the body 20. The channel 30 spans the entire length of the body 20. Channel 30 extends from the first end 15 to the second end 25.

Body 20 has a circular, or a generally circular, cross-sectional shape. Body 20 also has a cylindrical, or a generally cylindrical shape. It is understood that the circular, cross-sectional shape of the body 20 can be altered (i.e., squeezed, pressed or packed), due to forces imparted upon the pellet 10 during industrial scale production and/or handling of the pellet while the pellet is still in a melted state. Consequently, the cross-sectional shape of the body 20 may be more elliptical in shape than circular in shape, thus the definition of "generally circular in cross-sectional shape."

The body 20 and the channel 30 each has a respective diameter body diameter 40 and channel diameter 45. The term, "diameter," as used herein, is the greatest length between two points on body/channel surface that extends through the center, through axis of symmetry A, of the body/channel. In other words, when the pellet 10 has an elliptical shape (as opposed to a circular shape), the diameter is the major axis of the ellipse. In an embodiment, the shape of the body 20 resembles a hockey puck.

Figure 2A:
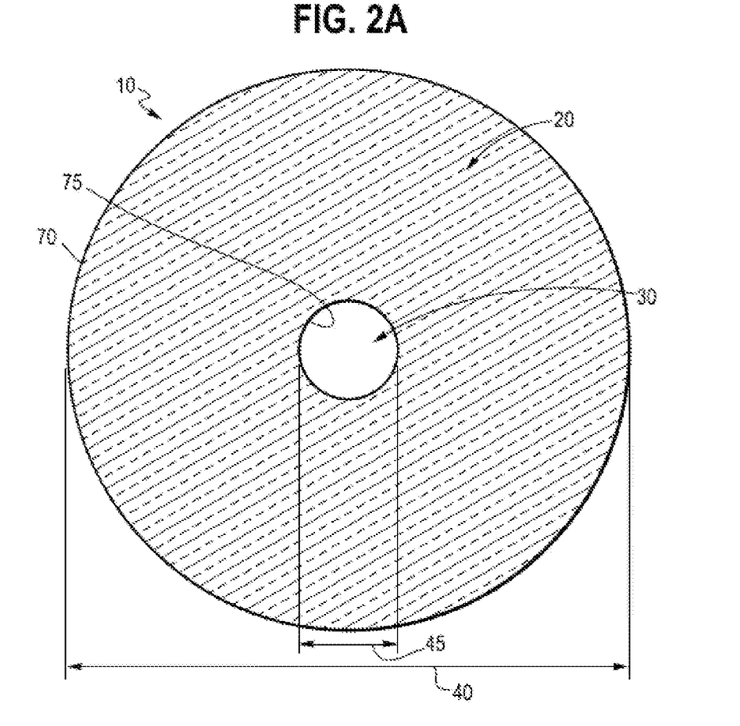
FIG. 2A is a cross-sectional view of the pellet as viewed along line 2A-2A of FIG. 1B.

FIG. 2A shows a body diameter 40 and a channel diameter 45 for the pellet 10. In an embodiment, the body diameter 40 is from 0.7 millimeters (mm), or 0.8 mm, or 0.9 mm, or 1.0 mm, or 1.5 mm to 3.7 mm, or 4.0 mm, or 4.2 mm, or 4.6 mm, or 5.0 mm. In a further embodiment, the body diameter 40 is from 0.7 to 5.0 mm, or from 0.8 to 4.2 mm, or from 1.0 to 4.0 mm. In an embodiment, the channel diameter 45 is from 0.10 mm, or 0.13 mm, or 0.15 mm, or 0.18 mm to 0.3 mm, or 0.4 mm, or 0.5 mm, or 0.6 mm, or 0.8 mm or 1 mm, or 1.6 mm, or 1.8 mm. In a further embodiment, the channel diameter 45 is from 0.10 to 1.8 mm, or from 0.15 to 1.6 mm, or from 0.18 to 1 mm, or from 0.18 to 0.8 mm, or from 0.18 to 0.6 mm.

The pellet 10 has a channel diameter-to-body diameter (CBD) ratio. The term, "channel diameter-to-body diameter (or "CBD") ratio", as used herein, refers to the result obtained by dividing the channel diameter by the body diameter (i.e., the CBD is the quotient of the channel diameter and the body diameter). For example when the channel diameter is 2.0 mm and the body diameter is 7.0 mm, the CBD ratio is 0.29. In an embodiment, the CBD ratio is from 0.03, or 0.05, or 0.07, or 0.11 to 0.13, or 0.15, or 0.2, or 0.25, or 0.3, or 0.35, or 0.4, or 0.45, or 0.5. In a further embodiment, the CBD ratio is from 0.03 to 0.5, or from 0.05 to 0.45, or from 0.05 to 0.25, or from 0.05 to 0.15, or from 0.11 to 0.15.

Figure 2B:
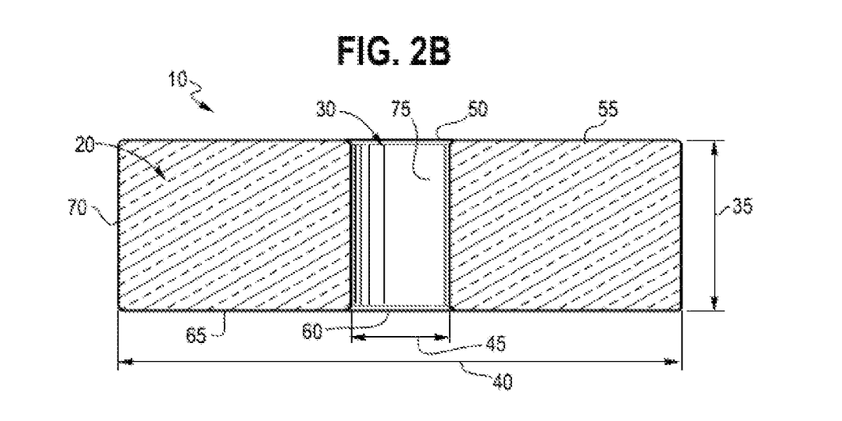
FIG. 2B is a cross-sectional view of the pellet as viewed along line 2B-2B of FIG. 1B.

FIG. 2B shows a length 35 for the body 20. In an embodiment, the length 35 is from 0.4 mm, 0.8 mm, or 1 mm, or 1.2 mm, or 1.4 mm, or 1.5 mm, or 1.6 mm, or 1.7 mm to 1.9 mm, or 2 mm, or 2.2 mm, or 2.5 mm, or 3 mm, or 3.3 mm, or 3.5 mm, or 4 mm. In a further embodiment, the length 35 is from 0.4 to 4 mm, or from 0.8 to 3.5 mm, or from 1 to 3.5 mm, or from 1.4 to 2.5 mm, or from 1.5 to 1.9 mm.

In an embodiment: (i) the length 35 is from 0.4 mm, or 0.8 mm, or 1 mm, or 1.2 mm, or 1.4 mm, or 1.5 mm, or 1.6 mm, or 1.7 mm to 1.9 mm, or 2 mm, or 2.2 mm, or 2.5 mm, or 3 mm, or 3.3 mm, or 3.5 mm, or 4 mm; (ii) the body diameter 40 is from 0.7 millimeters (mm), or 0.8 mm, or 0.9 mm, or 1.0 mm, or 1.5 mm to 3.7 mm, or 4.0 mm, or 4.2 mm, or 4.6 mm, or 5.0 mm; and (iii) the channel diameter 45 is from 0.10 mm, or 0.13 mm, or 0.15 mm, or 0.18 mm to 0.3 mm, or 0.4 mm, or 0.5 mm, or 0.6 mm, or 0.8 mm or 1 mm, or 1.6 mm, or 1.8 mm. In a further embodiment: (i) the length 35 is from 0.4 to 4 mm, or from 0.8 to 3.5 mm, or from 1 to 3.5 mm, or from 1.4 to 2.5 mm, or from 1.5 to 1.9 mm; (ii) the body diameter 40 is from 0.7 to 5.0 mm, or from 0.8 to 4.2 mm, or from 1.0 to 4.0 mm; and (iii) the channel diameter 45 is from 0.10 to 1.8 mm, or from 0.15 to 1.6 mm, or from 0.18 to 1 mm, or from 0.18 to 0.8 mm, or from 0.18 to 0.6 mm.

Returning to FIG. 16, a first face 55 of pellet 10 is shown. The first face 55 is located at the first end 15. A first orifice 50 is located in the center of the first face 55. The first orifice 50 is circular in shape, or generally circular in shape, and opens into the channel 30. The first orifice 50 has an area that is a function of the channel diameter 45. It is understood that the area of the first orifice 50 is a void space and the first orifice 50 does not have a surface. The first face 55 and the first orifice 50 form concentric circles that are bisected by the axis of symmetry A. The first face 55 has a surface that does not include the first orifice 50. In other words, the first face 55 has the shape of a flat ring.

A second orifice 60 is located in the center of a second face 65. The second orifice 60 is circular in shape, or generally circular in shape, and opens into the channel 30. The second orifice 60 has an area that is a function of the channel diameter 45. It is understood that the area of the second orifice 60 is a void space and the second orifice 60 does not have a surface. The second face 65 and the second orifice 60 form concentric circles that are bisected by the axis of symmetry A. The second face 65 has a surface that does not include the second orifice 60. In other words, the second face 65 has the shape of a flat ring.

The first face 55 has a "first surface area" that is the product of the expression $(0.25 \times \pi \times [(\text{the body diameter } 40)^2 - (\text{the channel diameter } 45)^2])$. The second face 65 has a "second surface area" that is the product of the expression $(0.25 \times \pi \times [(\text{the body diameter } 40)^2 - (\text{the channel diameter } 45)^2])$. The surface area of the first face 55 is equal to, or substantially equal to, the surface area of the second face 65.

The body 20 has a body surface that includes a "facial surface." The facial surface includes the first face 55 and the second face 65. The facial surface has a "facial surface area" that is the sum of the surface area of the first face 55 and the surface area of the second face 65. The facial surface area is the product of the expression $2 \times (0.25 \times \pi \times [(\text{the body diameter } 40)^2 - (\text{the channel diameter } 45)^2])$.

Figure 3:
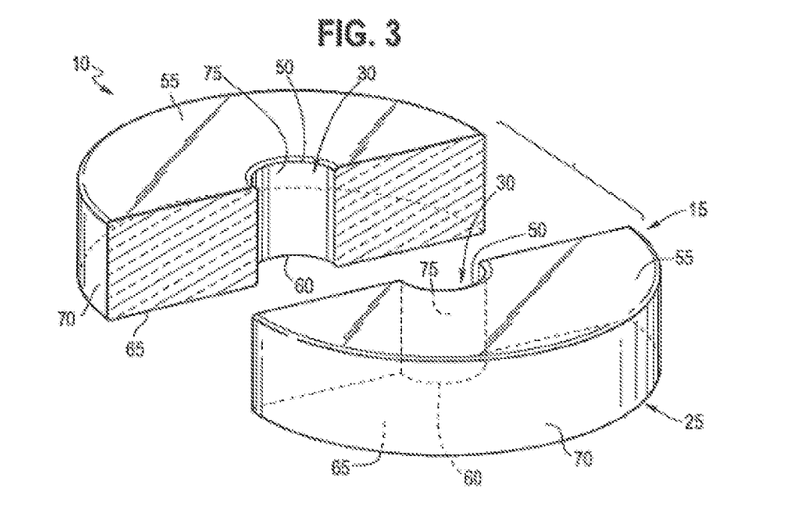
FIG. 3 is an exploded view of the pellet of FIG. 1B.

FIG. 3 shows a shell 70. The shell 70 is the outer surface of the body 20 that is parallel to the axis of symmetry A. Shell 70 has a cylindrical, or a generally cylindrical shape. Shell 70 includes a "shell surface" and a "shell surface area," the latter of which is the product of the expression ($\pi \times$ the body diameter $40 \times$ the length 35). The body 20 has a "body surface" that includes the shell surface and the facial surface. The body surface has a "body surface area" that is the sum of the shell surface area and the facial surface area. In an embodiment, the body surface area is from 25 square millimeters ($mm^2$), or 30 $mm^2$, or 32 $mm^2$, or 34 $mm^2$, or 35 $mm^2$ to 40 $mm^2$, or 45 $mm^2$, or 50 $mm^2$. In a further embodiment, the body surface area is from 25 to 50 $mm^2$, or from 30 to 45 $mm^2$, or from 35 to 40 $mm^2$.

The channel 30 has a channel surface 75 including a "channel surface area." The channel surface area is the product of the expression ($\pi \times$ the channel diameter $45 \times$ the length 35). In an embodiment, the channel surface area is from 0.5 $mm^2$, or 1 $mm^2$, or 2 $mm^2$, or 3 $mm^2$ to 6 $mm^2$, to 7 $mm^2$, or 8 $mm^2$, or 9 $mm^2$, or 10 $mm^2$, or 11 $mm^2$. In a further embodiment, the channel surface area is from 0.5 to 11 $mm^2$, or from 1 to 9 $mm^2$, or from 1 to 8 $mm^2$, or from 2 to 8 $mm^2$.

The pellet 10 has a surface area that is the sum of the body surface area and the channel surface area. In an embodiment, the pellet surface area is from 4 $mm^2$, or 15 $mm^2$, or 25 $mm^2$, or 30 $mm^2$, or 35 $mm^2$ to 40 $mm^2$, or 45 $mm^2$, or 50 $mm^2$, or 60 $mm^2$, or 70 $mm^2$, or 80 $mm^2$. In a further embodiment, the pellet surface area is from 15 to 80 $mm^2$, or from 30 to 60 $mm^2$, or from 35 to 50 $mm^2$.

In an embodiment, (i) the length 35 is from 0.4 mm, or 0.8 mm, or 1 mm, or 1.2 mm, or 1.4 mm, or 1.5 mm, or 1.6 mm, or 1.7 mm to 1.9 mm, or 2 mm, or 2.2 mm, or 2.5 mm, or 3 mm, or 3.3 mm, or 3.5 mm, or 4 mm; (ii) the body diameter 40 is from 0.7 mm, or 0.8 mm, or 0.9 mm, or 1.0 mm, or 1.5 mm to 3.7 mm, or 4.0 mm, or 4.2 mm, or 4.6 mm, or 5.0 mm; (iii) the pellet surface area is from 4 $mm^2$, or 15 $mm^2$, or 25 $mm^2$, or 30 $mm^2$, or 35 $mm^2$ to 40 $mm^2$, or 45 $mm^2$, or 50 $mm^2$, or 60 $mm^2$, or 70 $mm^2$, or 80 $mm^2$ and (iv) the CBD ratio is from 0.03, or 0.05, or 0.07, or 0.11 to 0.13, or 0.15, or 0.2, or 0.25, or 0.3, or 0.35, or 0.4, or 0.45, or 0.5. In a further embodiment, (i) the length 35 is from 0.4 to 4 mm, or from 0.8 to 3.5 mm, or from 1 to 3.5 mm, or from 1.4 to 2.5 mm, or from 1.5 to 1.9 mm; (ii) the body diameter 40 is from 0.7 to 5.0 mm, or from 0.8 to 4.2 mm, or from 1.0 to 4.0 mm; (iii) the pellet surface area is from 15 to 80 $mm^2$, or from 30 to 60 $mm^2$, or from 35 to 50 $mm^2$ and (iv) the CBD ratio is from 0.03 to 0.5, or from 0.05 to 0.45, or from 0.05 to 0.25, or from 0.05 to 0.15, or from 0.11 to 0.15.

The term, "standard pellet," as used herein, refers to a pellet without a channel (i.e. a "solid pellet") that is otherwise identical to the pellet 10 of the preset disclosure, the standard pellet has the same body diameter 40 and the same body length 35 as the pellet 10 and the standard pellet is made of the same polymeric material as the body 20 of the pellet 10. In an embodiment, the surface area of pellet 10 is greater than the surface area of a standard pellet because of the presence of channel 20 in the pellet 10. A ratio of the pellet surface area-to-standard pellet surface area is termed the "PSP ratio." In an embodiment the PSP ratio is from 1.02, or 1.03, or 1.05, or 1.07 to 1.09, or 1.1, or 1.11, or 1.12, or 1.15, or 1.2, or 1.4. In a further embodiment the PSP ratio is from 1.02 to 1.4, or from 1.05 to 1.15, or from 1.05 to 1.11.

The pellet 10 has a channel surface area-to-body surface area (CSBS) ratio. The term, "channel surface area-to-body surface area ratio," (or "CSBS") as used herein, refers to the result obtained by dividing the channel surface area by the body surface area (i.e., the CSBS is the quotient of the channel surface area by the body surface area). For example when the channel surface area is 2.0 $mm^2$ and the body surface area is 7.0 $mm^2$, the CSBS ratio is 0.29. In an embodiment, the CSBS ratio is from 0.02, or 0.03, or 0.06, or 0.10, or 0.13 to 0.15, or 0.18, or 0.21, or 0.23, or 0.25, or 0.3. In a further embodiment the CSBS ratio is from 0.02 to 0.3, or from 0.03 to 0.25, or from 0.03 to 0.23, or from 0.03 to 0.21, or from 0.03 to 0.18.

In an embodiment, (i) the length 35 is from 0.4 mm, or 0.8 mm, or 1 mm, or 1.2 mm, or 1.4 mm, or 1.5 mm, or 1.6 mm, or 1.7 mm to 1.9 mm, or 2 mm, or 2.2 mm, or 2.5 mm, or 3 mm, or 3.3 mm, or 3.5 mm, or 4 mm; (ii) the body diameter 40 is from 0.7 mm, or 0.8 mm, or 0.9 mm, or 1.0 mm, or 1.5 mm to 3.7 mm, or 4.0 mm, or 4.2 mm, or 4.6 mm, or 5.0 mm; (iii) the pellet surface area is from 4 $mm^2$, or 15 $mm^2$, or 25 $mm^2$, or 30 $mm^2$, or 35 $mm^2$ to 40 $mm^2$, or 45 $mm^2$, or 50 $mm^2$, or 60 $mm^2$, or 70 $mm^2$, or 80 $mm^2$ and (iv) the CSBS ratio is from 0.02, or 0.03, or 0.06, or 0.10, or 0.13 to 0.15, or 0.18, or 0.21, or 0.23, or 0.25, or 0.3. In a further embodiment, (i) the length 35 is from 0.4 to 4 mm, or from 0.8 to 3.5 mm, or from 1 to 3.5 mm, or from 1.4 to 2.5 mm, or from 1.5 to 1.9 mm; (ii) the body diameter 40 is from 0.7 to 5.0 mm, or from 0.8 to 4.2 mm, or from 1.0 to 4.0 mm; (iii) the pellet surface area is from 15 to 80 $mm^2$, or from 30 to 60 $mm^2$, or from 35 to 50 $mm^2$ and (iv) the CSBS ratio is from 0.02 to 0.3, or from 0.03 to 0.25, or from 0.03 to 0.23, or from 0.03 to 0.21, or from 0.03 to 0.18.

FIG. 1B shows that the first end 15 and the second end 25 are open ends.

Figure 4A:
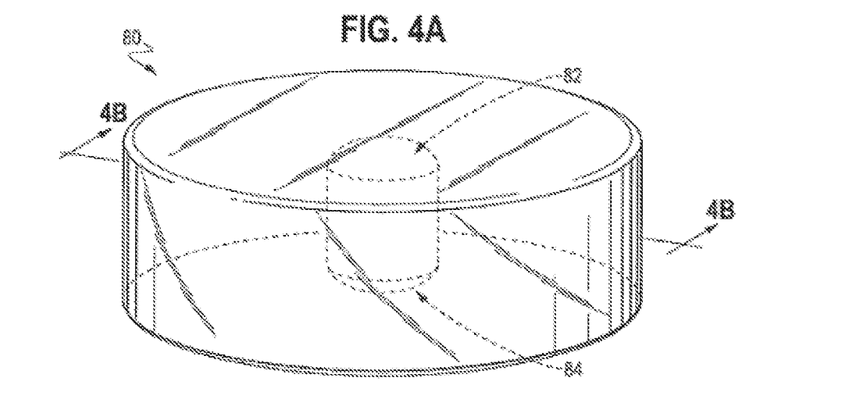
FIG. 4A is a perspective view of a closed pellet, in accordance with an embodiment of the present disclosure.
Figure 4B:
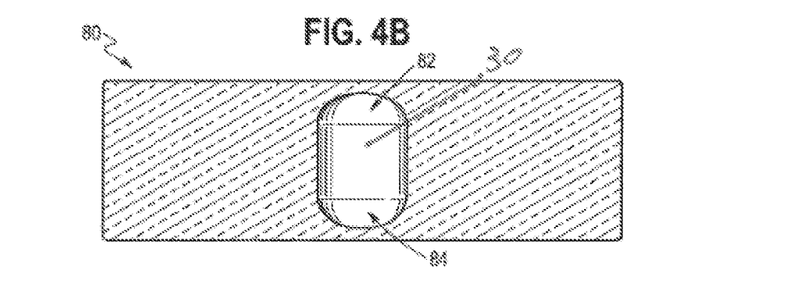
FIG. 4B is a cross-sectional view of the closed pellet as viewed along line 4B-4B of FIG. 4A.

FIGS. 4A-4B show a closed pellet 80. The closed pellet 80 includes a first dosed end 82 and a second closed end 84 and channel 30. The remaining features of closed pellet 80 are identical to the features of the pellet 10, as described herein.

The body 20 is composed of a polymeric material. In an embodiment, the polymeric material is selected from the following materials polyolefin, crosslinkable polyolefin, polyarnide, polyimide, polyester, polycarbonate, polysulfide, polysulfone, polyurethane, polyether, polythioether, wax, hot melt adhesive, thermoplastic elastomer, rubber, aromatic vinyl polymer, aliphatic vinyl polymer, aromatic alkenyl polymer, and any combination thereof. In a further embodiment, the polymeric material is selected from an ethylene-based polymer, an olefin-based polymer, (i.e. a polyolefin), an organic polymer, a propylene-based polymer, a thermoplastic polymer, a thermoset polymer, a polymer melt-blend, polymer blends thereof and combinations thereof.

In an embodiment, the body is composed of an ethylene-based polymer. Non-limiting examples of suitable ethylene-based polymer include ethylene/alpha-olefin interpolymers and ethylene/alpha-olefin copolymers. In an embodiment, the alpha-olefins include, but are not limited to, $C_3$-$C_{20}$ alpha-olefins. In a further embodiment, the alpha-olefins include propylene, 1-butene, 1-pentene, 1-hexene, 1-heptene and 1-octene.

In an embodiment, the polymeric material for body 20 is an aromatic polyester, a phenol-formaldehyde resin, a polyimide, a polyacrylonitrile, a polyethylene terephthalate, a polyimide, a polystyrene, a polytetrafluoroethylene, a polyvinyl chloride, a thermoplastic polyurethane and combinations thereof.

The polymeric material may comprise two or more embodiments disclosed herein.

In an embodiment, the body 20 includes an additive. The additive is absorbed into the body 20. In an embodiment, the additive is adsorbed on the body surface. In an further embodiment, the additive is absorbed into the body 20 and is adsorbed on the body surface. The term "absorption," and derivatives thereof (i.e., "absorbed"), as used herein, is the assimilation of molecular species of the additive throughout the bulk (i.e., within), the body 20. The term "adsorption," and derivatives thereof (i.e., "adsorbed"), as used herein, is the accumulation of the molecular species of the additive at the body surface rather than within in the bulk of the body 20.

In an embodiment, the channel 30 includes an additive. The additive in the channel is in the liquid state. The liquid additive is located in the channel 30 and the liquid additive is in direct contact with the channel surface 75. The liquid additive absorbs onto the channel surface 75. In an embodiment, the liquid additive is absorbed into the body 20 through the channel surface 75.

In an embodiment, the additive is a liquid and includes a silane, a peroxide, an isocyanurate, a catalyst, an antioxidant, a UV stabilizer, a processing aid and combinations thereof. In a further embodiment, the additive is a liquid and is a mixture of a silane and a peroxide, a mixture of a silane and a catalyst, a mixture of a peroxide and an antioxidant, and combinations thereof. In a further embodiment, the peroxide is an organic peroxide. In another embodiment, the additive is dicumyl peroxide, tert-butylperoxy-2-ethylhexyl carbonate, triallylisocyanurate, methacryloylpropyl trimethoxysilane and combinations thereof.

The additive may comprise two or more embodiments disclosed herein.

In an embodiment, the pellet 10 is produced as disclosed in co-pending application PCT/CN2019/080380, filed on 29 Mar. 2019, the entire contents of which is incorporated by reference herein.

Process

The present disclosure provides a process. In an embodiment, the process includes providing a pellet including a body that is composed of a polymeric material. The body includes a first end and an opposing second end. The body includes a channel extending through the body from the first end to the second end. The process includes soaking the pellet in an additive that is in a liquid state. The additive has a material that is selected from a silane, an organic peroxide, an isocyanurate and combinations thereof. The process includes forming a loaded pellet having the material in the body.

The process includes, providing pellet 10 shown in FIG. 1B. Pellet 10 includes a body 20. The body 20 includes a first end 15 and a second end 25. Pellet 10 includes a channel 30. Channel 30 extends through the body 20 from the first end 15 to the second end 25. The process includes soaking pellet 10 in an additive that is in a liquid state. In an embodiment, soaking includes contacting pellet 10 and the liquid additive, with optional agitation. In a further embodiment, soaking includes floating the pellet 10 upon the liquid additive. In another embodiment, soaking includes completely immersing the pellet 10 within the liquid additive.

The additive includes a material selected from a silane, a peroxide, an isocyanurate a catalyst, an antioxidant, a UV stabilizer, a processing aid and combinations thereof. In a further embodiment, the additive is a mixture of a silane and a peroxide, a mixture of a silane and a catalyst, a mixture of a peroxide and an antioxidant, and combinations thereof. In a further embodiment, the peroxide is an organic peroxide. In another embodiment, the additive is dicumyl peroxide, tert-butylperoxy-2-ethylhexyl carbonate, triallylisocyanurate, methacryloylpropyl trimethoxysilane and combinations thereof.

In an embodiment, the soaking step is performed at ambient temperature (15° C.-25° C.), with or without agitation. In a further embodiment, the soaking step is performed at elevated temperature (greater than or equal to 26° C.), with or without agitation.

The additive may comprise two or more embodiments disclosed herein.

The process includes forming a loaded pellet. The term, "loaded pellet," as used herein, refers to a pellet (a hollow pellet), having a quantity of additive absorbed within the body of the loaded pellet. It is understood that the loaded pellet may also include an amount of the additive located in the channel 30. The loaded pellet includes an additive capacity. The term "additive capacity," as used herein, is the maximum amount of additive that the hollow pellet can absorb and adsorb. The additive capacity is determined by soaking the pellet in excess additive (in a liquid state) for a duration of 24 hours. For example, when the loaded pellet mass is 25 g after 24 hours soaking in excess liquid additive and the initial pellet mass is 20 g, the additive capacity is 5 g.

In an embodiment, the process includes obtaining, with the soaking, at least 95% of the additive capacity of the pellet in a time duration that is 6 hours (h) or less at ambient temperature. In a further embodiment, the process includes obtaining, with the soaking 95% of the additive capacity of the pellet in a time duration from 1 h, or 2 h, or 3 h, or 4 h to 5 h, or less than 6 h at ambient temperature.

The process of soaking includes absorbing a portion of the liquid additive into the body 20 through the channel 30. In an embodiment, the liquid additive passes through the channel 30 then enters into the body 20. In a further embodiment, the additive passes through the channel 30 then absorbs into the body 20. In another embodiment, the additive passes through the channel 30 then absorbs into, and simultaneously adsorbs onto, the body 20.

The present disclosure is described more fully through the following examples. Unless otherwise noted, all parts and percentages are by weight.

EXAMPLES

The raw materials used to formulate the Inventive Examples ("IE") are provided in Table 1 below.

TABLE 1

| Trade Name | Chemical Class and Description | Supplier |
|---|---|---|
| XUS 38660.00 | Ethylene/octene copolymer<br>Density: 0.874 g/cm³<br>MI: 4.8 g/10 min @ 190° C./2.16 kg | The Dow Chemical Company |

1. Hollow Pellets

Inventive Examples 1-8 (IE-1 to IE-8) are hollow pellets that are imaged with optical microscopy. The optical microscopy images are analyzed to provide the dimensions shown in Table 2.

TABLE 2

| Sample ID | Channel Diameter (mm) | Body Diameter (mm) | Pellet Length (mm) | Body S.A. (mm²) | Channel S.A. (mm²) | Pellet S.A. (mm²) | CBD Ratio | CSBS Ratio |
|---|---|---|---|---|---|---|---|---|
| IE-1 | 0.18 | 3.33 | 1.8 | 36.2 | 1.02 | 37.2 | 0.054 | 0.03 |
| IE-2 | 0.37 | 3.22 | 1.8 | 34.3 | 2.09 | 36.4 | 0.11 | 0.06 |
| IE-3 | 0.82 | 3.34 | 1.8 | 35.3 | 4.63 | 40.0 | 0.25 | 0.13 |
| IE-4 | 0.39 | 3.51 | 1.8 | 38.9 | 2.20 | 41.2 | 0.11 | 0.06 |
| IE-5 | 0.63 | 3.35 | 1.8 | 35.9 | 3.56 | 39.5 | 0.19 | 0.10 |
| IE-6 | 0.55 | 3.57 | 1.8 | 39.7 | 3.11 | 42.8 | 0.15 | 0.08 |
| IE-7 | 0.99 | 3.56 | 1.8 | 38.5 | 5.60 | 44.0 | 0.28 | 0.15 |
| IE-8 | 1.52 | 3.79 | 1.8 | 40.4 | 8.59 | 48.9 | 0.40 | 0.21 |

CBD is ratio of channel diameter to body diameter
CSBS is ratio of channel surface area to body surface area
S.A. is surface area 2. Soaking Test Hollow pellets composed of XUS 38660 and having the structure as shown in FIGS. 1B, 2A, 2B and the dimensions of Inventive Example 1 (IE-1) in Table 2 are soaked in a liquid additive composed of dicumyl peroxide, vinyltrimethoxysilane, curing coagent, and UV agent. Solid pellets composed XUS 38660 and having the same body diameter and pellet length (and no channel) as IE4 are soaked in the same liquid additive. The pellets are soaked in the liquid additive at room temperature and agitated on a roller with a rotation speed of 70 rpm. The pellets have an additive capacity of 1.92 g of the liquid additive. The hollow pellets of IE-1 absorb 95% of the additive capacity (1.82 g) in 5.5 hours. The solid pellets reach 95% of the additive capacity in 17.5 hours.

Figure 5:
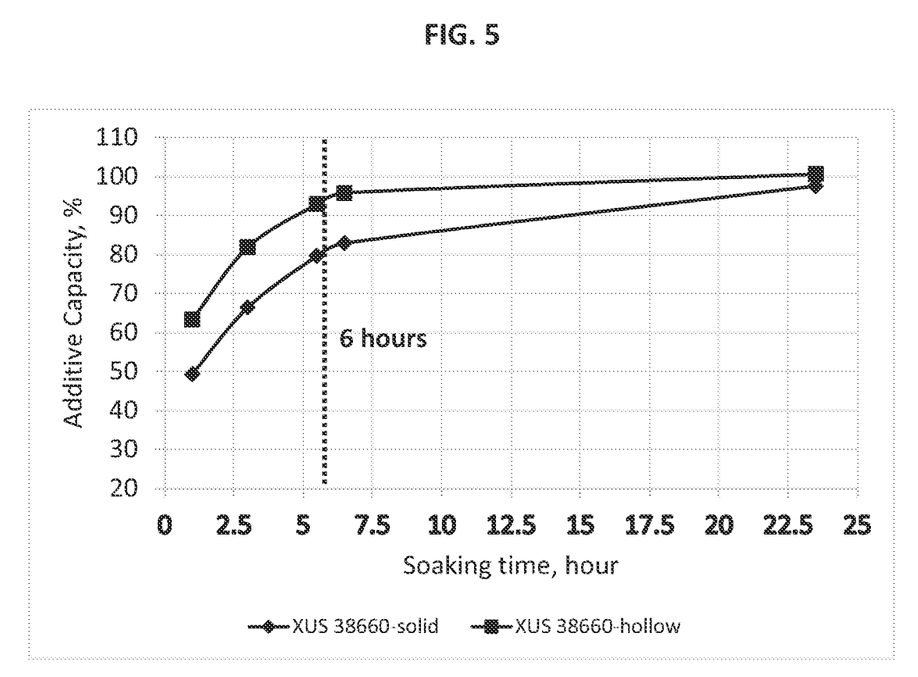
FIG. 5 is a plot of additive capacity percentage versus soaking time duration.

FIG. 5 shows additive capacity percentage plotted against the soaking time duration for inventive IE-1 (hollow pellet) versus comparative solid pellet.

It is specifically intended that the present disclosure not be limited to the embodiments and illustrations contained herein, but include modified forms of those embodiments including portions of the embodiments and combinations of elements of different embodiments as come with the scope of the following claims.

We claim:
1. A pellet comprising:
a body having a body surface and a body surface area, the body surface comprising a shell surface and a facial surface, the body surface area comprising a shell surface area and a facial surface area, the body having a first end and an opposing second end, the body composed of a polymeric material, the body having a length and a diameter (body diameter);
a channel having a channel surface and a channel surface area, the channel having a diameter (channel diameter), the channel defining a void space extending through the body from the first end to the second end;
the pellet has a channel diameter-to-body diameter ratio from 0.05 to 0.45; and
the pellet has a channel surface area-to-body surface area ratio from 0.03 to 0.23.

2. The pellet of claim 1 wherein the body has a length from 1.0 millimeters (mm) to 3.5 mm.

3. The pellet of claim 2 wherein the body diameter is from 1.0 mm to 4.0 mm.

4. The pellet of claim 3 wherein the channel diameter is from 0.15 mm to 1.6 mm.

5. The pellet of claim 4 wherein the channel extends through both the first end of the body and the second end of the body.

6. The pellet of claim 4 wherein at least one of the ends is closed and the channel extends to the at least one closed end.

7. The pellet of claim 6 wherein each end is closed and the channel extends to each closed end.

8. The pellet of claim 7 comprising an additive in the body.

9. The pellet of claim 8 comprising the additive in the void space defined by the channel, the additive in the liquid state.

10. The pellet of claim 9 wherein the body is composed from a polymeric material selected from the group consisting of polyolefin, crosslinkable polyolefin, polyamide, polyimide, polyester, polycarbonate, polysulfide, polysulfone, polyurethane, polyether, polythioether, wax, hot melt adhesive, thermoplastic elastomer, rubber, aromatic vinyl polymer, aliphatic vinyl polymer, aromatic alkenyl polymer, and combinations thereof.

11. A process comprising:
providing a pellet having a body having a body surface and a body surface area, the body surface comprising a shell surface and a facial surface, the body surface area comprising a shell surface area and a facial surface area, the body having a first end and an opposing second end, the body composed of a polymeric material, the body having a length and a diameter (body diameter), the pellet having a channel having a channel surface and a channel surface area, the channel having a diameter (channel diameter), the channel defining a void space extending through the body from the first end to the second end, the pellet has a channel diameter-to-body diameter ratio from 0.05 to 0.45 and the pellet has a channel surface area-to-body surface area ratio from 0.03 to 0.23;

soaking the pellet in an additive, the additive in a liquid state, the additive having a material selected from the group consisting of a silane, an organic peroxide, an isocyanurate and combinations thereof; and forming a loaded pellet having the material in the body.

12. The process of 11 wherein the loaded pellet has an additive capacity, the process comprising obtaining, with the soaking, at least 95% of the additive capacity, in a time duration of 6 hours or less at ambient temperature.

13. The process of claim 12 wherein the soaking comprises a portion of the additive entering into the body through the channel.

\* \* \* \* \*